Dec. 1, 1964

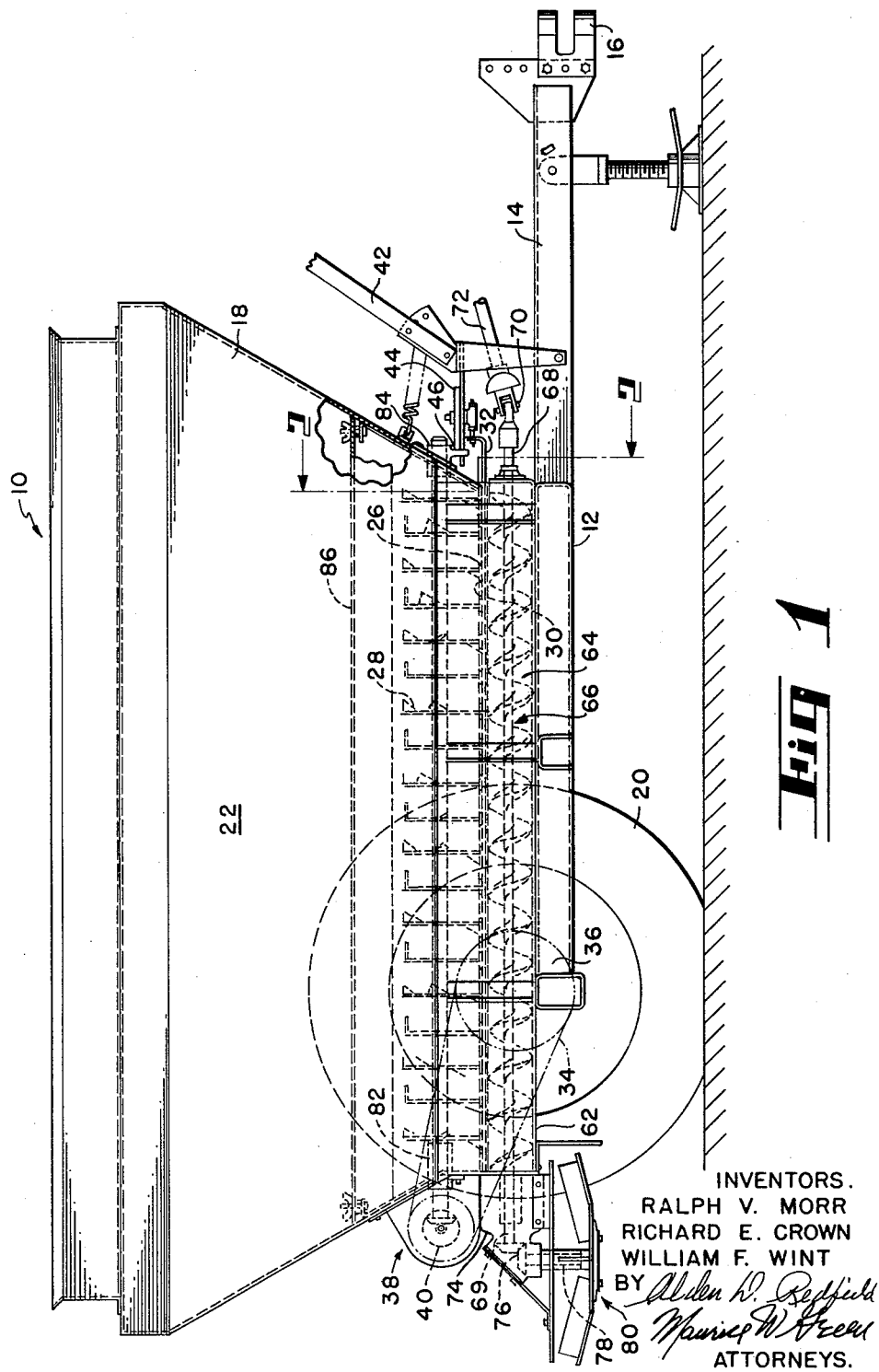

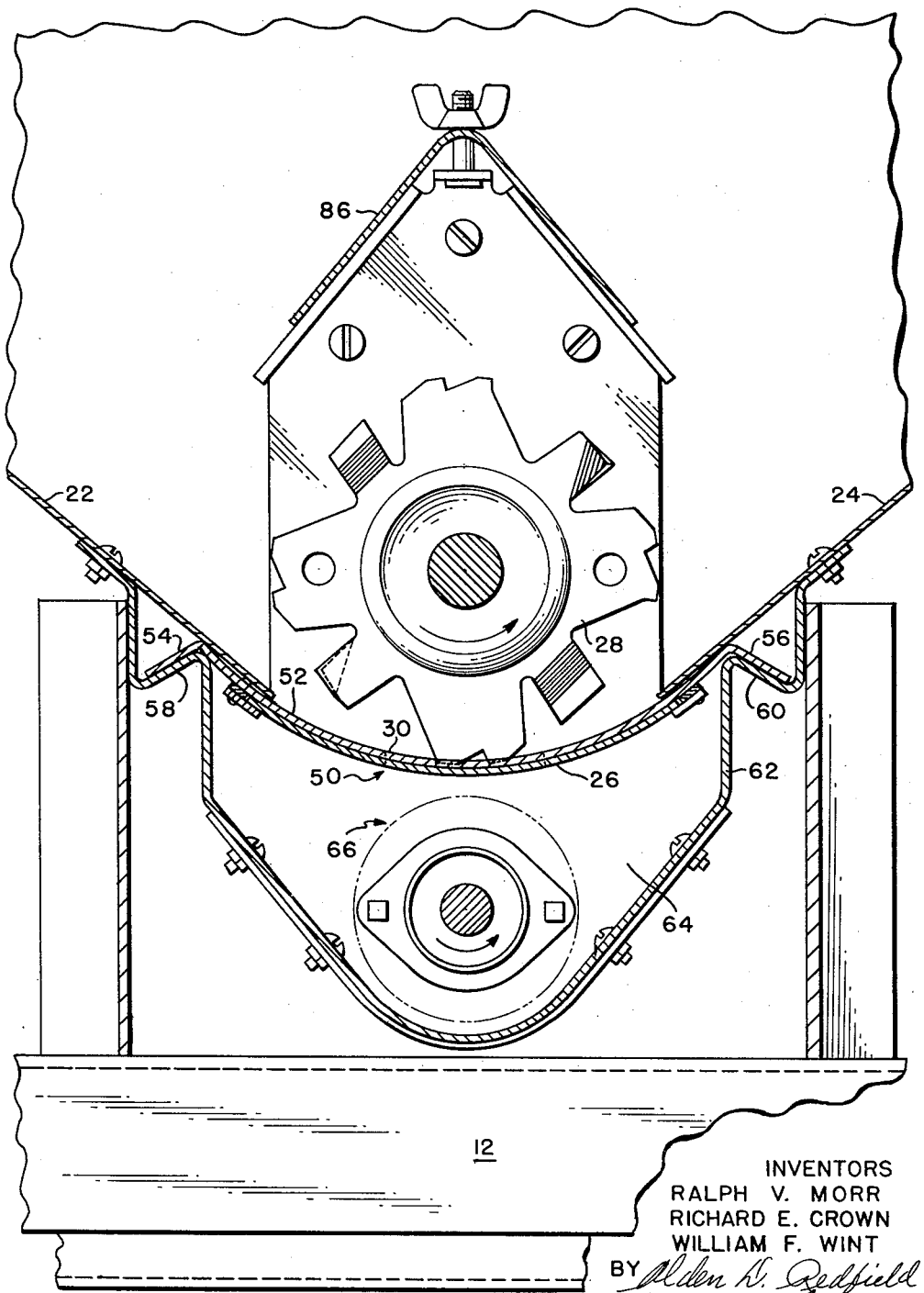

R. V. MORR ETAL 3,159,406

SPINNER TYPE FERTILIZER SPREADER

Filed April 10, 1963

INVENTORS.
RALPH V. MORR
RICHARD E. CROWN
WILLIAM F. WINT
BY Alden D. Redfield
Maurice W. Freed
ATTORNEYS.

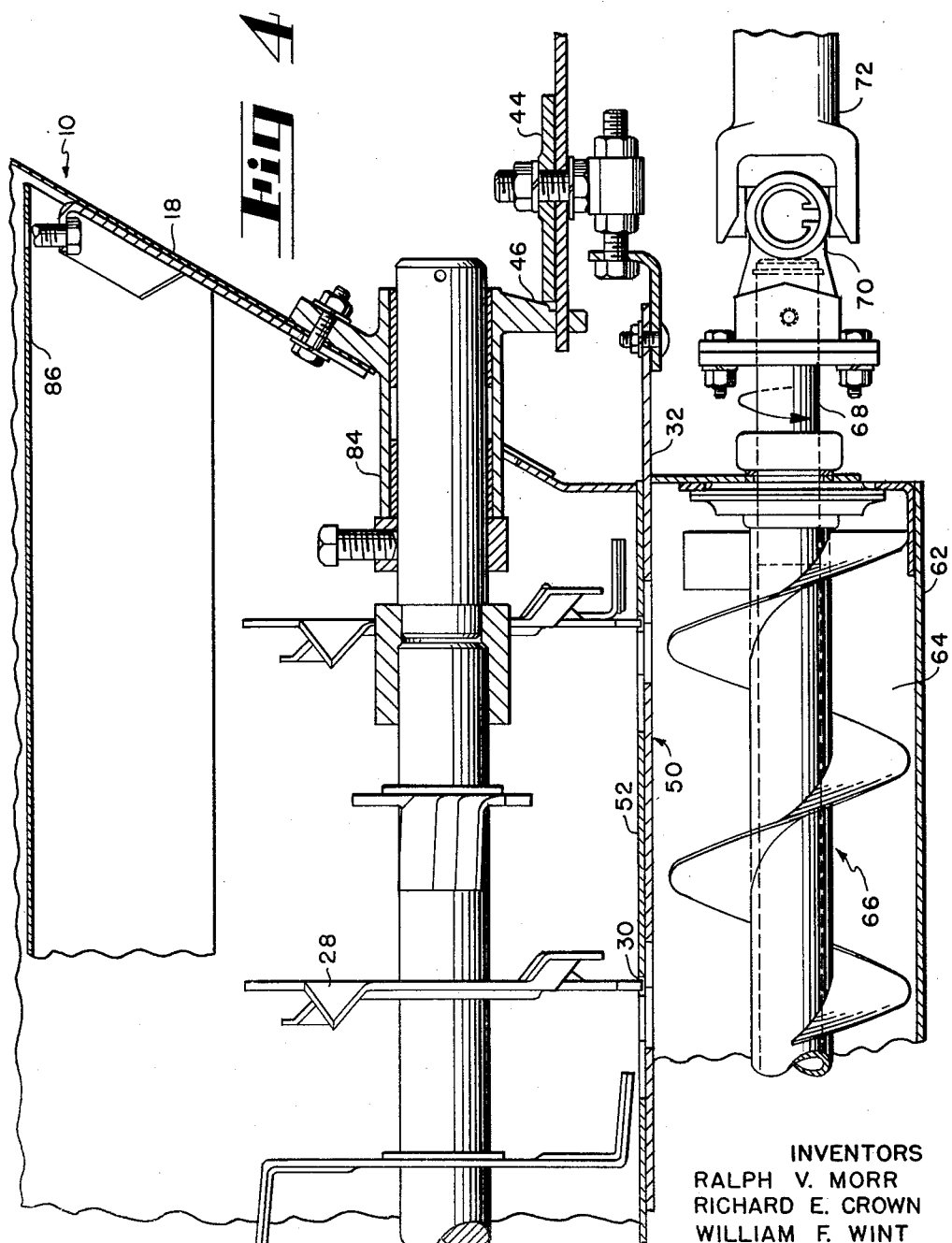

United States Patent Office 3,159,406
Patented Dec. 1, 1964

3,159,406
SPINNER TYPE FERTILIZER SPREADER
Ralph V. Morr and Richard E. Crown, Celina, and William F. Wint, Coldwater, Ohio, assignors to Avco Corporation, Coldwater, Ohio, a corporation of Delaware
Filed Apr. 10, 1963, Ser. No. 271,963
3 Claims. (Cl. 275—8)

This invention relates to so-called spinner type fertilizer spreaders and more particularly relates to a combination of drive accomplishing positive and accurate metering of material from a large hopper to be accurately spread on the ground therefrom.

There are available in the prior art many so-called spinner type scattering devices characterized by a spinner, generally carried at the rear of a wheeled vehicle moving over the ground, from which fertilizer is to be spread. These spinners generally rotate about a vertical axis with the plane of rotation of the spinner substantially parallel to the ground, with radial vanes throwing material, during rotation, in a substantially horizontal direction in such an arc as to fall in a spread pattern onto the ground as the wheeled vehicle moves forward. The material is fed onto the rotating spinner by a feeding mechanism having an outlet above the spinner. Some later types employ a relatively large hopper carried on the wheeled vehicle, the hopper tapering to a bottom in which a belt conveyor is placed, such hopper bottom and belt extending in a generally longitudinal direction substantially parallel to the direction of travel of the vehicle. This longitudinally extending conveyor, or belt, moves from the front to rear in the hopper as the vehicle moves over the ground and the material to be spread is discharged onto the spinner which rotates at the rear of the vehicle, as above described. There have also been devices which provide agitating means in the bottom of the hopper combined with conveying means under the hopper, but with both the agitating and conveying means driven by a common power source.

Metering of so-called commercial fertilizer for spreading from drill type units has been substantially improved in recent years and such a device is disclosed in U.S. Patent 2,510,231. This device provides for accurate metering of such material by ground driven wheels, and when carried over the ground provides satisfactory and accurate metering of material and passage of the material through the metering openings for accurate distribution onto the ground.

It is a primary object of this invention to combine the mechanism for accurate metering of commercial type fertilizer, accomplished by ground-driven agitator unit, with an independently powered conveyor and spinner type spreader which receives material from the ground-driven agitator unit for spreading, thereby accomplishing more positive conveying and spreading of material without complicating or otherwise disturbing the accuracy of the ground-driven agitator unit.

It is another object to provide a positive conveying and spreading mechanism powered independently of a ground-driven agitator metering unit, the said conveying and spreading assembly comprising a longitudinally positioned rotatable auger driven from its forward end and located under the outlet of the ground-driven agitator metering unit, with a spinner rotated from the rotatable auger, located rearwardly of a wheeled vehicle.

The above and other objects of the invention will appear more fully from the following more detailed description and by reference to the accompanying drawings forming a part hereof and wherein:

FIGURE 1 is a side view of the spinner type fertilizer spreader partly in section and with dotted line showings of several parts of the mechanism.

FIGURE 2 is a section substantially on the line 2—2 of FIGURE 1, showing the agitator and auger assembly and adjacent parts.

FIGURE 3 is a perspective view taken at the lower front portion of the spreader assembly, showing the manner of disassembly of the shutter and bottom assembly.

FIGURE 4 is a fragmentary cross-section taken longitudinally of the spreader assembly adjacent the front portion thereof.

Figure 7:
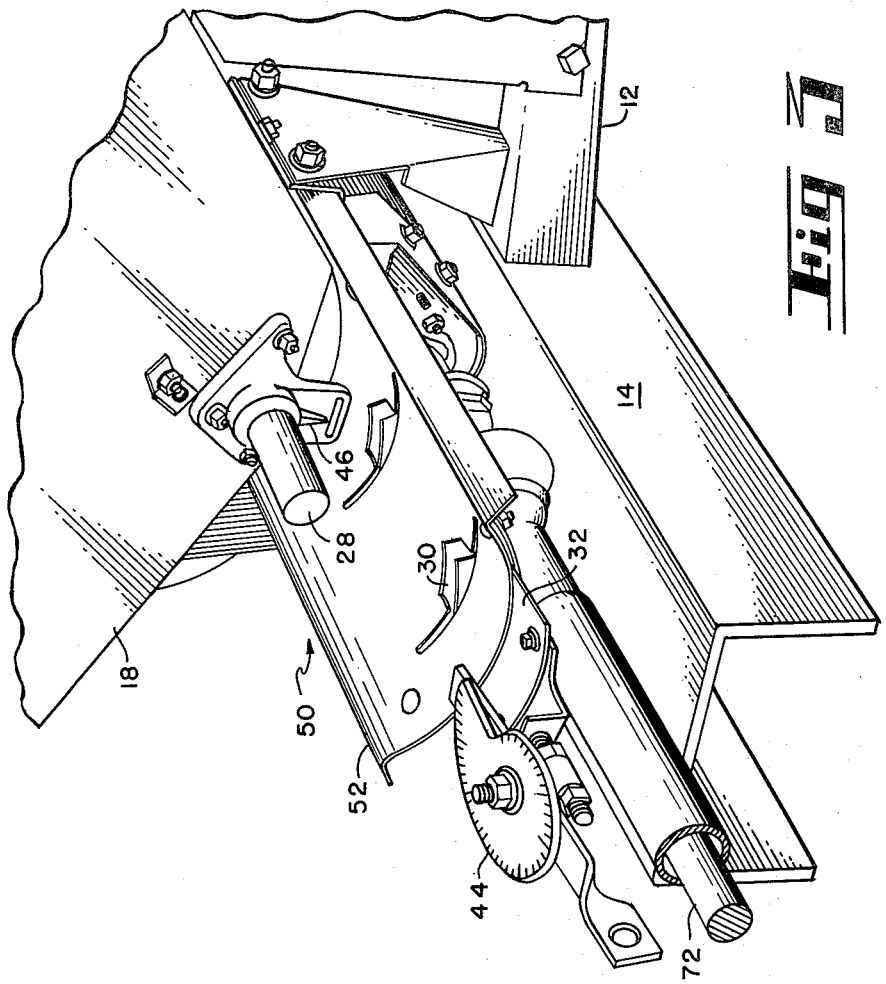
Figure 5:
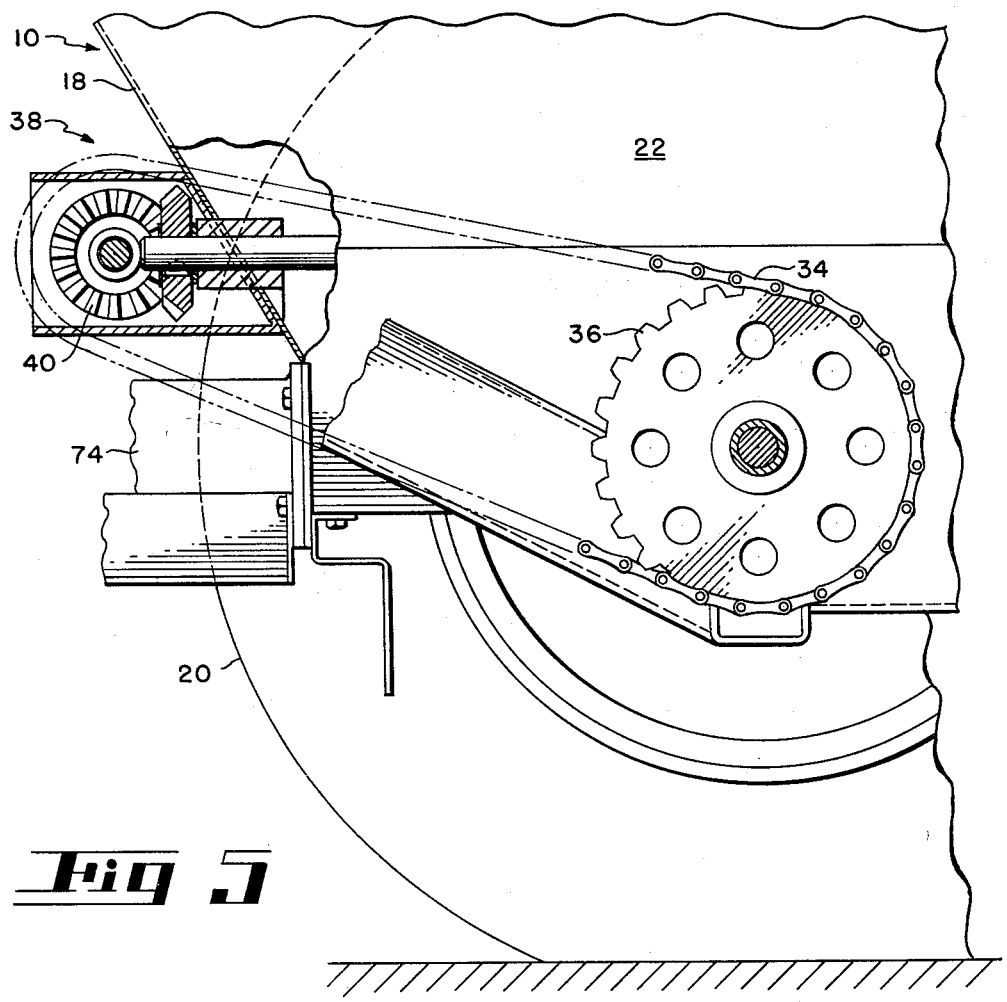
FIGURE 5 is a fragmentary cross-section taken longitudinally of the spreader assembly adjacent the rear portion thereof.

Referring to the drawings, a wheeled vehicle 10 includes a frame 12 having a forwardly-extending drawbar 14 having a tractor connection 16, the frame 12 supporting a material-containing hopper 18. Ground wheels 20 support the vehicle for travel over the ground.

The bottom of the hopper 18 has sides 22, 24 tapering to a relatively narrow outlet region 26 extending lonitudinally of the wheeled vehicle parallel to its direction of travel. Positioned and mounted for rotation in this hopper above the outlet region 26, is an agitator 28 having its axis of rotation also substantially parallel to direction of travel of the wheeled unit and above the outlet region 26. Spaced outlet openings 30 are provided in the outlet region 26 and an adjustable shutter 32 mounted for sliding movement below the oepnings is also provided. The general structure of the agitator openings and shutter are preferably of the general structure shown in U.S. Patent 2,510,231 and the hopper and agitator assembly, together with the adjustable shutter in the structure illustrated, is substantially like that shown in the aforesaid U.S. patent.

For driving and rotating the agitator 28 there is provided a ground wheel driven chain 34, which drives from a sprocket 36 on one of the ground wheels 20 to a sprocket and shaft 38 to a pair of bevel gears 40 to thereby rotate the agitator 28 by ground wheel drive. The shutter 32, which provides for adjusting the size of the openings 30 in the outlet region 26, is adjusted by hand lever 42 which moves the entire shutter assembly, including a cam 44 carried thereby, the lever 42 being a lever which provides an on and off, or complete closing or opening, of the shutter plate as limited by the position of the cam 44 against stop 46, the magnitude of the opening of the shutter being determined by the angular position of the cam 44 in the manner well known in the art for such setting device.

The mechanism above described completes a ground-driven metering assembly providing a satisfactory and accurate flow of pelleted, granular or seed material from the hopper from the several openings 30 in the bottom of the hopper 18 and this ground drive is a tested and known unit for accomplishing this purpose.

Referring particularly to FIGURES 2 and 3, a subassembly 50, made up of the adjustable shutter 32 and a panel 52 forming the bottom of the hopper 18 in the region where the spaced outlet openings 30 are provided, is so constructed as to slide outwardly from the front end of the hopper carrying with it, as shown in FIGURE 3, the adjusting cam 44, the panel 52, and the shutter 32. The removable feature of this assembly is accomplished by flanges 54, 56 on the longitudinal outer edges of the panel 52 bent downwardly to rest upon ledges 58, 60 formed by bending a sheet metal housing member 62 which, as shown in FIGURE 2, is formed to extend downwardly to provide a chamber 64 under the outlet region 26.

The chamber, thus formed by the member 62, provides a receiving trough longitudinally extending under the outlet region 26 to receive material discharged from the hopper into this chamber 64. As shown in FIGURES 1 and 2, an auger conveyor assembly 66 is mounted for rotation in this receiving trough and this auger conveyor has its axis of rotation spaced downwardly from and substantially parallel to the axis of the agitator 28. The forward end 68 of this auger assembly has a universal joint drive connection 70 attached thereto, which is connected with the power-take-off shaft 72, or other drive shaft, of a power source (such as a tractor PTO) independent of the rotating drive for the agitator 28 through ground wheel connection previously described. The length of the auger 66 is sufficient to extend rearward over the length of the agitator 28 and has a shaft portion 69 extending further rearwardly through a housing 74 and provided with bevel gearing 76 to drive a vertical shaft 78 of a spinner type distributing element 80, so positioned as to rotate in a substantially horizontal plane and being located at the rear of the wheeled vehicle 10 will receive material carried by the conveyor 66 in chamber 64 and downwardly by gravity onto the spinner type spreading member 80.

In addition to the removable feature accomplishing removal of the subassembly 50 comprising the adjustable shutter and panel bottom 52, the agitator 28 is also removable by removing the end bearing assemblies 82, 84; and a deflector plate 86 provided above the agitator 28 is also removable. When the shutter assembly 50 is removed, and if necessary the deflector and the agitator, are all removed, the unit may be used as an auger type unloading wagon if desired.

The operation of the unit completely assembled will now be discussed. The material to be spread is carried in the hopper 18, the unit being pulled over the ground by a tractor or other motive power, and the agitator 28 being rotated by one of the drive wheels 20 through the chain 34. Thus the rotation of the agitator 28 is in direct proportion to the ground covered by the unit in its forward movement. Therefore, for any setting of the adjusting cam 44, which determines the shutter opening of the outlet openings 30, there will be a metering of material into the trough 64 of a definite amount proportional to the ground covered by the spreading assembly. This metering of material is admittedly by a mechanism well known in the art, but in the prior art mechanisms which represent this part of the unit here disclosed, the discharge is onto the ground. In the present device, however, the auger 66 moves the metered material rearwardly by the separate drive afforded by a separate power source, here the power-take-off shaft of a tractor, as shown at 72. The metered material, representing the material metered in proportion to the ground covered, is therefore pushed to the rear and onto the rotating spinner assembly 80 and thrown outwardly therefrom by centrifugal force in a horizontal direction onto a definite pattern. It is noted that the amount of material thrown onto the ground from the rear of this unit is determined by the metering device made up of the ground-driven agitator 28 and its shutter openings. Therefore, within a range the effect of the speed of the auger 66 is not critical in so far as the amount of material made available at the rear of the wheeled unit is concerned. There is variation if the speed of rotation of the spinner is such as to throw the material a greater distance by relatively large increase or variation in speed of rotation. However, with a speed of rotation usually accomplished in a tractor and available at its power-take-off shaft, this may be controlled within a limit which will not be critical in so far as spreading of material per acre is concerned. It is noted also that the variation in speed of the power-take-off shaft is not directly controlled by gear ratio change in the transmission of the tractor, so that for all practical purposes the metering is accomplished by the ground drive. This drive is not complicated by having associated therewith the drive necessary to positively carry material rearwardly by means of the auger conveyor, and the ground wheels also do not supply the power required for the spinner. It is therefore possible to accomplish a satisfactory spreading of material without disturbing the very positive and very definite metering function of the ground drive in its rotation of the agitator.

It is noted also that the auger type conveyor, which is a rotatable unit driven from its forward connection to a power-take-off shaft, affords a positive drive for the spinner located at the rear of the spreader and thus results in a very positive transfer of metered material from the bottom of the hopper to a positively rotated spinner. The positive rotation of the spinner is assured by its rotative drive connection between the end of the rotating auger and the vertical shaft of the spinner. All of this drive works in satisfactory cooperation with the undisturbed ground-driven metering unit with both drives operating to complete functions in a satisfactory manner. The burden of carrying a drive for the conveyor and spinner, along with drive to the metering device, is thus made unnecessary and satisfactory operation of the metering device is assured.

Although the invention has been described by reference to a specific structure found practical in actual operation, it is intended that various modifications may be made without departing from the fundamental principles as defined by the scope of the following claims:

We claim:

1. In a material spreader of the type adapted for movement over the ground for metered spreading of material comprising:
   a vehicle adapted for movement over the ground;
   a hopper carried on said vehicle;
   ground wheels supporting said hopper for containing material to be spread;
   a bottom for said hopper providing spaced metering openings therein extending substantially parallel to the direction of forward movement of said vehicle and forming the bottom outlet means from said hopper;
   an agitator having its axis of rotation also extending substantially parallel to the direction of forward movement of said vehicle and having portions spaced and positioned to cooperate with the spaced metering openings in said hopper bottom;
   an auger positioned below said hopper bottom and having its axis of rotation extending substantially parallel to said agitator axis;
   a spinner connected to rotate with said auger and positioned at the end of said auger at the rearward end of said vehicle;
   a drive connection between at least one of the wheels of said vehicle and said agitator constructed and arranged to rotate said agitator in definite relation to ground movement of said wheel;
   means independent of said wheel drive connection for rotating said auger and spinner whereby material metered by said agitator and hopper bottom by ground drive is delivered to said auger and spinner for spreading over the ground.

2. In a material spreader of the type adapted for movement over the ground for metered spreading of granular material comprising:
   a hopper for carrying material to be spread;
   a ground wheel rotatable by ground contact on movement of said spreader over the ground;
   rotatable agitating and metering means having spaced openings extending longitudinally of said hopper for discharging material from said hopper in metered quantities proportional to rate of rotation of said means and forming the sole bottom outlet means from said hopper;

a drive connection from said ground wheel connected to rotate said agitating and metering means in proportion to the rotation of said ground wheel;

an auger conveyor extending longitudinally in the direction of forward movement of said vehicle and mounted for rotation on said vehicle and positioned to receive metered material from the spaced openings of said metering means on discharge from said hopper;

a rear outlet from auger conveyor;

a spinner type scattering element positioned rearward of said spreader adjacent said rear outlet of said auger conveyor and mounted for rotation on a substantially vertical axis;

means connecting said spinner type scattering device for rotation with said auger conveyor;

a conveyor drive connected for rotating said auger conveyor and said spinner type scattering device independent of said ground wheel and its drive connection;

whereby said material, metered and discharged from said hopper onto said conveyor from said spaced openings, is delivered for scattering by said scattering device without disturbing the ground wheel controlled metering of material from said hopper.

3. In a material spreader of the type adapted for movement over the ground for metered spreading of material, including a spinner located at the rear thereof comprising:

a vehicle assembly;

a hopper supported on said vehicle assembly;

ground wheels supporting said hopper for containing material to be spread;

a bottom for said hopper having spaced metering openings positioned to provide control of flow of material from the bottom from said spaced metering openings of said hopper;

an agitator mounted with its axis of rotation upward from said hopper bottom and extending in a direction substantially parallel to the direction of forward movement of said spreader and its said vehicle assembly;

agitator vanes carried by said agitator and projecting into said spaced metering openings of said hopper bottom;

a shutter cooperating with said openings to provide manually controlled variation of said openings thereby to provide for metered flow of material through said openings;

a drive connection from at least one of said ground wheels to said agitator connected to rotate said agitator in definite relation to ground movement of said wheels;

an auger extending longitudinally of said vehicle relative to its direction of travel and positioned below said hopper bottom and said spaced metering openings also positioned with its axis of rotation substantially parallel to the axis of rotation of said agitator;

a rearward outlet from said auger;

a spinner positioned rearward of said auger adjacent said rearward outlet to receive material to be spread and having an axis of rotation substantially at right angles to the axis of rotation of said auger and having its plane of rotation substantially parallel to the ground and upwardly therefrom;

a drive connection between said auger and said spinner;

drive means independent of said ground wheel drive connection for driving said auger without disturbing the ground wheel controlled metering of material from said hopper;

a power-take-off connection to said auger drive means adaptable for connection to a tractor positioned forwardly of said vehicle and drawing said vehicle over the ground.

References Cited in the file of this patent
UNITED STATES PATENTS

| | | |
|---|---|---|
| 2,421,211 | Lutz | May 27, 1947 |
| 2,490,971 | Lawson et al. | Dec. 13, 1949 |
| 2,510,231 | Juzwiak | June 6, 1950 |
| 2,614,849 | Holben | Oct. 21, 1952 |
| 2,965,379 | Ganley | Dec. 20, 1960 |
| 3,085,807 | Tyler | Apr. 16, 1963 |